United States Patent
Delchev et al.

(10) Patent No.: US 9,311,612 B2
(45) Date of Patent: Apr. 12, 2016

(54) SYSTEM AND METHOD FOR IMPROVED SERVICE ORIENTED ARCHITECTURE

(75) Inventors: Ivan Delchev, Zurich (CH); Juergen Vogel, St. Gallen (CH)

(73) Assignee: SAP SE, Walldorf (DE)

( * ) Notice: Subject to any disclaimer, the term of this patent is extended or adjusted under 35 U.S.C. 154(b) by 443 days.

(21) Appl. No.: 12/976,058

(22) Filed: Dec. 22, 2010

(65) Prior Publication Data

US 2012/0167092 A1 Jun. 28, 2012

(51) Int. Cl.
*G06Q 10/06* (2012.01)
*G06F 9/48* (2006.01)

(52) U.S. Cl.
CPC .............. *G06Q 10/06* (2013.01); *G06F 9/4843* (2013.01)

(58) Field of Classification Search
USPC .............. 718/1–105; 709/201–203, 223–226; 705/7.11–7.27
See application file for complete search history.

(56) References Cited

U.S. PATENT DOCUMENTS

| | | | |
|---|---|---|---|
| 2002/0184294 A1* | 12/2002 | Volkoff et al. | 709/104 |
| 2004/0019890 A1* | 1/2004 | Verbeke et al. | 718/100 |
| 2006/0168174 A1* | 7/2006 | Gebhart et al. | 709/223 |
| 2008/0235327 A1* | 9/2008 | Maes et al. | 709/203 |
| 2009/0201812 A1* | 8/2009 | Dettori et al. | 370/235 |
| 2011/0138394 A1* | 6/2011 | Ravishankar et al. | 718/104 |
| 2011/0239126 A1* | 9/2011 | Erickson et al. | 715/744 |
| 2011/0265091 A1* | 10/2011 | Ly et al. | 718/103 |

OTHER PUBLICATIONS

"European Application Serial No. 11010010.4, Search Report mailed May 18, 2012", 8 pgs.
Dean, J., et al., "MapReduce: simplified data processing on large clusters", Communications of the ACM, 51(1), (Jan. 2008), 107-113.
Koulouzis, Spiros, et al., "Data Transport between Visualization Web Services for Medical Image Analysis", International Conference on Computational Science, ICCS 2010, (2010), 1727-1736.
Wieland, Matthias, et al., "Towards Reference Passing in Web Service and Workflow-based Applications", 2009 IEEE International Enterprise Distributed Object Computing Conference, (Sep. 1, 2009), 109-118.
"D1.4.1A SOA4All References Architecture Specification", SOA 4 All, (Jun. 3, 2009), 70 pgs.
"Enterprise Service Bus", Wikipedia, [Online]. Retrieved from the Internet: <URL: en.wikipedia.org/wiki/Enterprise_service_bus>, (Accessed Dec. 2, 2010), 6 pgs.
"ESB Myth Busters: 10 Enterprise Service Bus Myths Debunked", [Online]. Retrieved from the Internet: <URL: soa.sys-con.com/node/48035/print>, (Accessed Dec. 2, 2010), 6 pgs.
"Pubsubhubbub", Wikipedia, [Online]. Retrieved from the Internet: <URL: en.wikipedia.org/wiki/Pubsubhubbub>, (Accessed Oct. 15, 2010), 2 pgs.

(Continued)

*Primary Examiner* — Abdullah Al Kawsar
(74) *Attorney, Agent, or Firm* — Schwegman Lundberg & Woessner, P.A.

(57) ABSTRACT

Certain embodiments enable improved execution of service-oriented tasks by coordinating service providers that access service-input values from other service providers and generate service-output values that are accessible by other service providers. Improved performance results from distributed operations of service providers that do not require centralized exchange of all information.

22 Claims, 4 Drawing Sheets

(56) References Cited

OTHER PUBLICATIONS

"Pubsubhubbub—Project Hosting on Google Code", [Online]. Retrieved from the Internet: <URL: code.google.com/p/pubsubhubbub/>, (Accessed Oct. 15, 2010), 3 pgs.

"Resource Description Framework", Wikipedia, [Online]. Retrieved from the Internet: <URL: en.wikipedia.org/wiki/Resource_Description_Framework>, (Accessed Oct. 15, 2010), 11 pgs.

"Resource Description Framework (RDF)", [Online]. Retrieved from the Internet: <URL: w3.org/RDF/>, (Accessed Oct. 15, 2010), 3 pgs.

"Service-oriented architecture", Wikipedia, [Online]. Retrieved from the Internet: <URL: en.wikipedia.org/wiki/Service-oriented_architecture>, (Accessed Dec. 2, 2010), 18 pgs.

"SOA4All", Wikipedia, [Online]. Retrieved from the Internet: <URL: en.wikipedia.org/wiki/SOA4All>, (Accessed Oct. 15, 2010), 2 pgs.

Woolf, Bobby, "ESB-oriented architecture: The wrong approach to adopting SOA", [Online]. Retrieved from the Internet: <URL: ibm.com/developerworks/webservices/library/ws-soa-esbarch/>, (Sep. 27, 2007), 8 pgs.

Zambonelli, Franco, "Organisational Abstractions for the Analysis and Design of Multi-Agent Systems", Workshop on Agent-Oriented Software Engineering at ICSE 2000, (Mar. 2, 2000), 15 pgs.

* cited by examiner

SYSTEM AND METHOD FOR IMPROVED SERVICE ORIENTED ARCHITECTURE

BACKGROUND

1. Technical Field

The present disclosure relates generally to computing and more particularly to service-oriented computing.

2. Description of Related Art

Service Oriented Architectures (SOA) provide a variety of advantages over more traditional methods of distributing computing. Those include and are not limited to platform-independence, loose coupling, dynamic search and binding, and location-independence. Implementations of SOA are often based on synchronous web services orchestrated by an Enterprise Service Bus (ESB), which decouples service providers from service consumers and supports service registration, discovery and orchestration including scheduling and load-balancing. In this context, service providers may operate as passive building blocks that simply perform a task when queried and reply with the result. Typically then all data requests and responses pass through the ESB, which may become a substantial bottleneck for processing service requests. Thus there is a need for systems and methods that enable improved coordination of service-oriented tasks.

SUMMARY

Certain embodiments enable improved execution of service-oriented tasks by coordinating service providers that access service-input values from other service providers and generate service-output values that are accessible by other service providers. Improved performance results from distributed operations of service providers that do not require centralized exchange of all information.

One embodiment relates to a method of executing a task that includes a sequence of services. This method includes saving the task as a sequence of services including a first service and a second service, where the saved task includes a first service-input location that indicates where first service-input values are stored for the first service. The method then includes sending a first task-pending notification to a first service provider corresponding to the first service, where the first task-pending notification includes the first service-input location. The method then includes receiving a first task-results notification from the first service provider, where the first task-results notification includes a first service-output location that indicates where the first service provider has stored corresponding first service-output values. The method then includes sending a second task-pending notification to a second service provider corresponding to the second service, where the second task-pending notification includes the first service-output location identified as a second service-input location that indicates where second service-input values are stored for the second service. The method then includes receiving a second task-results notification from the second service provider, where the second task-results notification includes a second service-output location that indicates where the second service provider has stored corresponding second service-output values. The process can be continued when the task includes additional services. Optionally, selected service-output values can be provided to a user as a final result of the task.

Another embodiment relates to an apparatus for carrying out the above-described method, where the apparatus includes a computer for executing instructions related to the method. For example, the computer may include a processor for executing at least some of the instructions. Additionally or alternatively the computer may include circuitry or other specialized hardware for executing at least some of the instructions. Another embodiment relates to a computer-readable medium that stores (e.g., tangibly embodies) a computer program for carrying out the above-described method with a computer. In these ways aspects of the disclosed embodiments enable improved coordination of service-oriented tasks.

DETAILED DESCRIPTION OF EXAMPLE EMBODIMENTS

Figure 1:
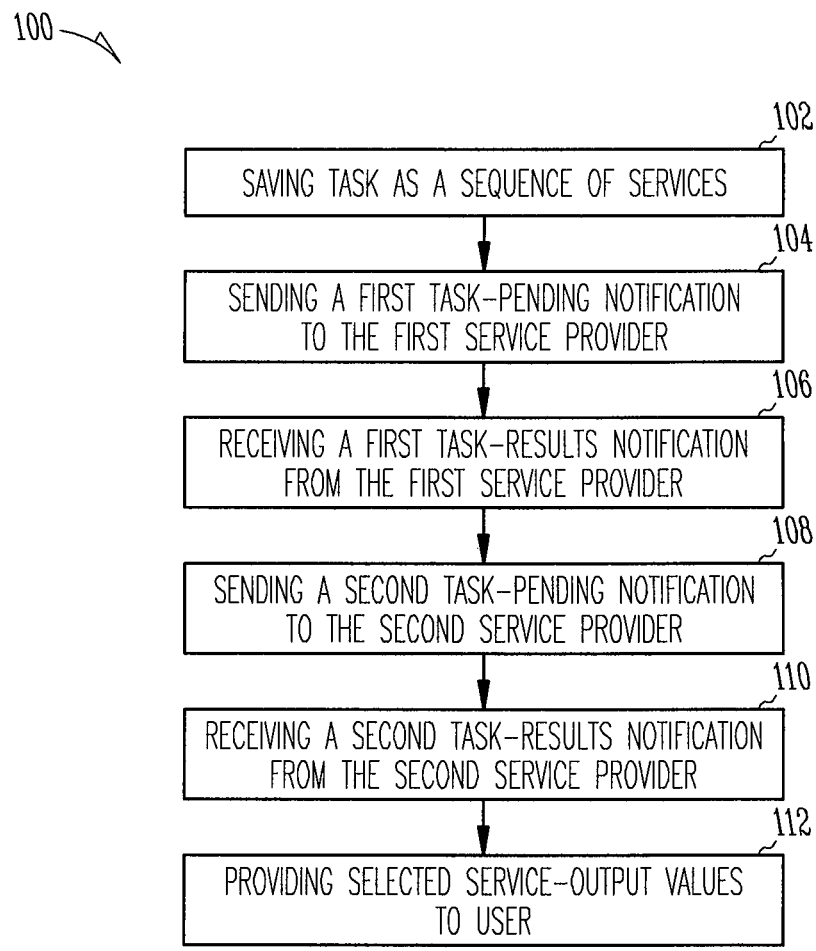
FIG. 1 is a flowchart that shows a method of executing a task according to an example embodiment.
Figure 2:
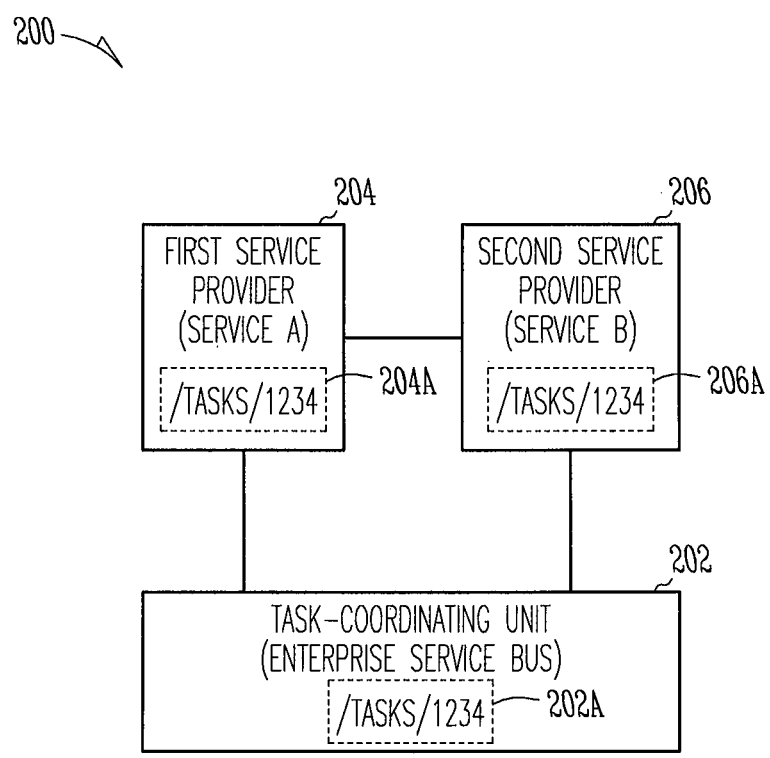
FIG. 2 is a diagram that shows a system related to the embodiment shown in FIG. 1.

FIG. 1 is a flowchart that shows a method 100 of executing a task according to an example embodiment. A first operation 102 includes saving the task as a sequence of services including a first service and a second service. For example, FIG. 2 shows a diagram of a system 200 that includes a task-coordinating unit 202, a first service provider 204 and a second service provider 206, where the first service provider 204 provides service A and the second service provider 206 provides service B. Typically the task-coordinating unit 202 includes an ESB as well as other conventional computing elements. ("D1.4.1A SOA4All Reference Architecture Specification," Krummenacher et al., SOA4All Consortium, Jun. 3, 2009.) The service providers 204, 206 may also include conventional computing elements, and the components of the system 200 may communicate via standard networking operations (e.g., Internet services).

In this example, the task is a sequence of just two services, and the task-coordinating unit 202 saves the task labelled "1234" in a file directory "/tasks/1234" 202A under its control (e.g., "ESB_URL/tasks/1234"). The task can be saved, for example, as a composition of services where Service A is followed by Service B (e.g., $S_B \cdot S_A$). More generally, additional services may be added or repeated (e.g., $S_C \cdot S_B \cdot S_A \cdot S_B \cdot S_A$). Additionally, the saved task includes a first service-input location that indicates where first service-input values are stored for the first service. In FIG. 2, for example, the first service-input values may also be stored in the same file directory "/tasks/1234" 202A or elsewhere in the system 200 (e.g., at one of the service providers 204, 206). Optionally, the task-coordinating unit 202 may receive task-input values from a user to specify the first service-input values. The task-coordinating unit 202 may have access to a database that relates services to service providers 204, 206 so that those relationships are immediately available. Additionally the service providers 204, 206 may have service-provider interfaces that allow access by the task-coordinating unit 202 in order to determine those relationships.

With reference again to FIG. 1, a second operation 104 includes sending a first task-pending notification from the task-coordinating unit 202 to the first service provider 204, where the first task-pending notification includes the first service-input location (e.g., in the task-coordinating unit's file directory "/tasks/1234" 202A). Next, the first service provider 204 provides the first service by accessing the first service-input values at the first service-input location, generating the first service-output values from the first service-input values, and storing the first service-output values at the first service-output location. The first service-output location is typically a file directory "/tasks/1234" 204A under the control of the first service provider 204 (e.g., "SERVICE_A_URL/tasks/1234").

A third operation 106 includes receiving a first task-results notification at the task-coordinating unit 202 from the first service provider 204. The first task-results notification includes the first service-output location that indicates where the first service provider 204 has stored the corresponding first service-output values (e.g., the file directory "/tasks/1234" 204A at the first service provider 204).

A fourth operation 108 includes sending a second task-pending notification from the task-coordinating unit 202 to the second service provider 206 corresponding to the second service. The second task-pending notification includes the first service-output location identified as a second service-input location that indicates where second service-input values are stored for the second service. Next the second service provider 206 provides the second service by accessing the second service-input values at the second service-input location, generating the second service-output values from the second service-input values, and storing the second service-output values at the second service-output location. Similarly as in the first service provider 204, the second service-output location is typically a file directory "/tasks/1234" 206A under the control of the second service provider 206 (e.g., "SERVICE_B_URL/tasks/1234").

A fifth operation 110 includes receiving a second task-results notification at the task-coordinating unit 202 from the second service provider 206, The second task-results notification includes the second service-output location that indicates where the second service provider 206 has stored corresponding second service-output values. In a case where a task includes a third service (e.g., $S_C \cdot S_B \cdot S_A$) the process can be continued by sending a third task-pending notification from the task-coordinating unit 202 to a third service provider, which in some cases may be identified with either the first or second service providers 204, 206.

When the task is completed, a sixth operation 112 includes providing selected service-output values to the user as a final result of the task. In the present example where the task includes just two services (i.e., $S_B \cdot S_A$) the selected service-output values may be identified as the second service-output values. Then the task-coordinating unit 202 may simply send the second service-output location to the user. Alternatively the task-coordinating unit 202 may first access the second service-output results at the second service-output location and then send the second service-output results to the user in some convenient format.

As a specific example, the user may submit task-input values that include a location (e.g., a zip code) where a hotel reservation is desired. The first service provider 204 may then fetch the task-input values from an accessible file directory "/tasks/1234" 202A, generate related hotel information including addresses, rates and on-line reservation access and save these results as first service-output values in the file directory "/tasks/1234" 204A under its control. The second service provider 206 may then access the first service provider's file directory 204A, fetch the first service-output values, augment the hotel information to include a graphical display that includes a map with icons that represent the hotels, and save these results as second service-output values in the file directory 206A under its control. The second service-output values then provide the desired final result including the graphical display that enables the user to access hotel information and make a reservation. In this way the operations of the first service provider 204 and the second service provider 206 are carried out as distributed operations with limited involvement by the task-coordinating unit 202.

Depending on the operational setting, the first and second task-pending notifications may each include a saved-task location that indicates where the saved task is stored (e.g., in the task-coordinating unit's file directory "/tasks/1234" 202A). Then the service providers 204, 206 also have access to details of the saved task in cases where the corresponding service-input values do not provide a complete specification for the service. In general, subject to conventional security concerns that may require password protection, the file directories 202A, 204A, 206A of the task-coordinating unit 202 and the service providers 204, 206 are accessible through conventional network access (e.g., a Uniform Resource Locator (URL)). Also depending on the operational setting, the task-coordinating unit 202 may update the saved task to indicate completion of a service in response to receiving the task-results notification from the corresponding service provider 204, 206.

In some cases, it may be desirable for one or more of the service providers 204, 206 to maintain a cache of service-output values that are generated from received service-input values. Then providing the service may include generating at least some service-output values by accessing cache values stored prior to receiving a corresponding task-pending notification. The service providers 204, 206 may additionally perform load-balancing and scheduling functions related to their own operations.

Note that the words first and second are used here and elsewhere for labeling purposes only and are not intended to denote any specific spatial or temporal ordering. Furthermore, the labeling of a first element does not imply the presence of a second element.

Additional embodiments relate to an apparatus for carrying out any one of the above-described methods, where the apparatus includes a computer for executing computer instructions related to the method. In this context the computer may be a general-purpose computer including, for example, a processor, memory, storage, and input/output devices (e.g., keyboard, display, disk drive, Internet connection, etc.). However, the computer may include circuitry or other specialized hardware for carrying out some or all aspects of the method. In some operational settings, the apparatus or computer may be configured as a system that includes one or more units, each of which is configured to carry out some aspects of the method either in software, in hardware or in some combination thereof. For example, the system may be configured as part of a computer network that includes the Internet. At least some values for the results of the method can be saved for later use in a computer-readable medium, including memory units (e.g., RAM (Random Access Memory), ROM (Read Only Memory)) and storage devices (e.g., hard-disk systems, optical storage systems).

Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language. The computer program may be stored as an encoded file in some useful format (e.g., binary, American Standard Code for Information Interchange (ASCII)). In some contexts, the computer-readable medium may be alternatively described as a computer-useable medium, a computer-storage medium, a computer-program medium, machine-readable medium or some alternative non-transitory storage medium. Depending on the operational setting, specified values for the above-described methods may correspond to input files for the computer program or computer.

Figure 3:
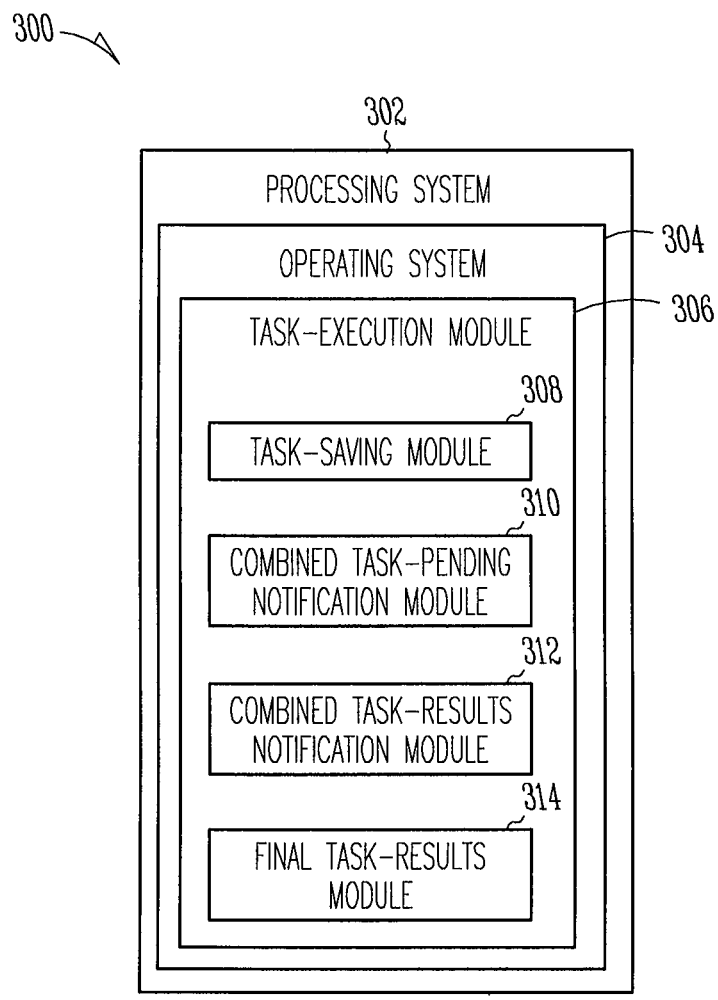
FIG. 3 is a schematic representation of an apparatus, in accordance with an example embodiment.

FIG. 3 shows a schematic representation of an apparatus 300, in accordance with an example embodiment for executing a task. For example, the apparatus 300 may be used to implement the method 100 of executing a task as described above. The apparatus 300 is shown to include a processing system 302 that may be implemented on a server, client, or other processing device that includes an operating system 304 for executing software instructions.

In accordance with an example embodiment, the apparatus 300 includes a task execution module 306 that includes a task-saving module 308, a combined task-pending notification module 310, a combined task-results notification module 312, and a final-task-results module 314. The combined task-pending notification module 310 can be further specified to include a first task-pending notification module, a second task-pending notification module, and so on. The combined task-results notification module 312 can be further specified to include a first task-results notification module, a second task-results notification module, and so on.

The task-saving module 308 operates to save the task as a sequence of services including a first service and a second service, where the saved task includes a first service-input location that indicates where first service-input values are stored for the first service. The first task-pending notification module 310A operates to send a first task-pending notification from the task-coordinating unit 202 (FIG. 2) to the first service provider 204 (FIG. 2), where the first task-pending notification includes the first service-input location. The first task-results notification module 312A operates to receive a first task-results notification from the first service provider 204, where the first task-results notification includes a first service-output location that indicates where the first service provider 204 has stored corresponding first service-output values.

The second task-pending notification module 310B operates to send a second task-pending notification to a second service provider 206 (FIG. 2) corresponding to the second service, where the second task-pending notification includes the first service-output location identified as a second service-input location that indicates where second service-input values are stored for the second service. The second task-results notification module 312B operates to receive a second task-results notification from the second service provider 206, where the second task-results notification includes a second service-output location that indicates where the second service provider 206 has stored corresponding second service-output values. The final-task-results module 314 operates to provide selected service-output values (e.g., the second service-output values) to a user as a final result of the task.

Figure 4:
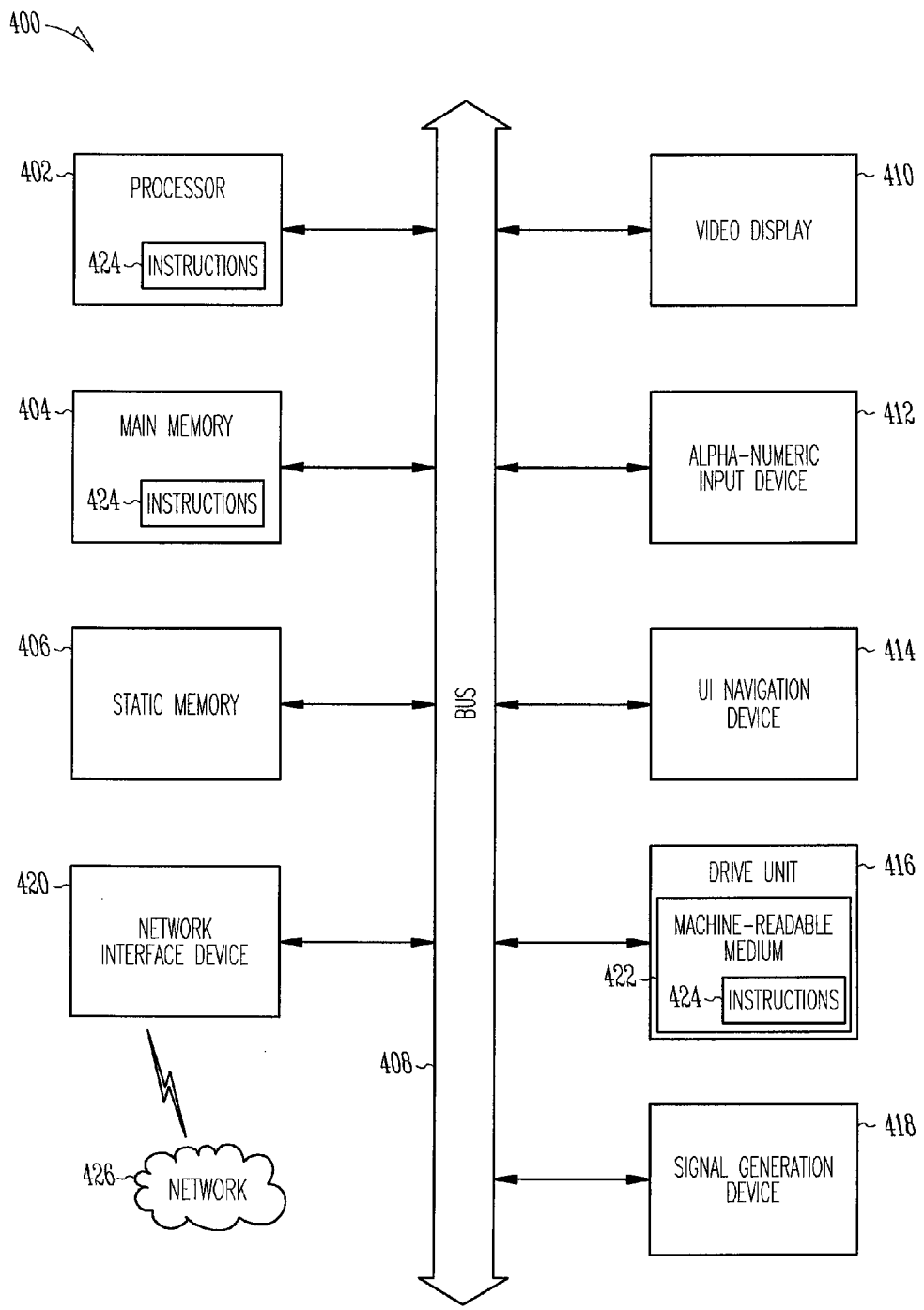
FIG. 4 is a block diagram of a computer processing system within which a set of instructions for causing the computer to perform any one of the methodologies discussed herein may be executed.

FIG. 4 is a block diagram of machine in the example form of a computer system 400 within which instructions for causing the machine to perform any one or more of the methodologies discussed here may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

In some contexts, a computer-readable medium may be described as a machine-readable medium. The disk drive unit 416 includes a machine-readable medium 422 on which is stored one or more sets of data structures and instructions 424 (e.g., software) embodying or utilizing any one or more of the methodologies or functions described herein. The instructions 424 may also reside, completely or at least partially, within the main memory 404 and/or within the processor 402 during execution thereof by the computer system 400, with the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more data structures and instructions 424. The term "machine-readable medium" shall also be taken to include any tangible medium that is capable of storing, encoding or carrying instructions for execution by the machine and that cause the machine to perform any one or more of the methodologies disclosed herein, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; Compact Disc Read-Only Memory (CD-ROM) and Digital Versatile Disc Read-Only Memory (DVD-ROM).

The instructions 424 may further be transmitted or received over a communications network 426 using a transmission medium. The instructions 424 may be transmitted using the network interface device 420 and any one of a number of well-known transfer protocols (e.g., Hypertext Transfer Protocol (HTTP)). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Certain embodiments are described herein as including logic or a number of components, modules, or mechanisms. Modules may constitute either software modules or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Although only certain embodiments have been described in detail above, those skilled in the art will readily appreciate that many modifications are possible without materially departing from the novel teachings of this disclosure. For example, aspects of embodiments disclosed above can be combined in other combinations to form additional embodiments. Accordingly, all such modifications are intended to be included within the scope of this disclosure.

What is claimed is:

1. A method of executing a task, the method comprising:
saving the task as a sequence of services including a first service and a second service with each non-final service output corresponding to a subsequent service input in the sequence of services, the saved task including a service-completion record for the services and a first service-input location that indicates where first service-input values are stored for the first service, the saved task being stored at a saved-task location that is connected via a communication bus to a plurality of service providers including a first service provider corresponding to the first service and a second service provider corresponding to the second service, each service provider performing distributed operations in response to a corresponding task-pending notification received via the communication bus, and the distributed operations being decentralized from operations related to sequencing the services of the task;
sending a first task-pending notification to the first service provider via the communication bus, the first task-pending notification including the first service-input location;

receiving a first task-results notification from the first service provider via the communication bus, the first task-results notification including a first service-output location that indicates where the first service provider has stored corresponding first service-output values via a first-service bus that is separate from the communication bus, the first service-output values being generated by the first service provider based on values from the first service-input location, and the values from the first service-input location being accessed by the first service provider separately from the communication bus via the first-service bus;

in response to receiving the first task-results notification, updating the service-completion record at the saved-task location to indicate a completion of the first service and sending a second task-pending notification to the second service provider via the communication bus, the second task-pending notification including the first service-output location identified as a second service-input location that indicates where second service-input values are stored for the second service;

receiving a second task-results notification from the second service provider via the communication bus, the second task-results notification including a second service-output location that indicates where the second service provider has stored corresponding second service-output values via a second-service bus that is separate from the communication bus, the second service-output values being generated by the second service provider based on values from the second service-input location, and the values from the second service-input location being accessed by the second service provider separately from the communication bus via the second-service bus; and in response to receiving the second task-results notification, updating the service-completion record at the saved-task location to indicate a completion of the second service.

2. The method of claim 1, further comprising: receiving task-input values from a user to specify the first service-input values.

3. The method of claim 1, further comprising: providing selected service-output values to a user as a final result of the task.

4. The method of claim 1, wherein the services include a third service with a corresponding third service provider connected to the communication bus, and the method further comprises:

sending a third task-pending notification to the third service provider via the communication bus, the third task-pending notification including the second service-output location identified as a third service-input location that indicates where input values for the third service are stored; and receiving a third task-results notification from the third service provider via the communication bus, the third task-results notification including a third service-output location that indicates where the third service provider has stored corresponding third service-output results via a third-service bus that is separate from the communication bus, the third service-output values being generated by the third service provider based on values from the third service-input location.

5. The method of claim 1, further comprising: identifying at least one of the service providers by accessing a service-provider interface and relating the service-provider interface to at least one of the services.

6. The method of claim 1, wherein the first and second task-pending notifications each include the saved-task location and the method further comprises:

providing the first service at the first service provider by accessing the first service-input values at the first service-input location and at least one first-service parameter at the saved-task location, generating the first service-output values from the first service-input values and the at least one first-service parameter, and storing the first service-output values at the first service-output location via the first-service bus; and providing the second service at the second service provider by accessing the second service-input values at the second service-input location and at least one second-service parameter at the saved-task location, generating the second service-output values from the second service-input values and the at least one second-service parameter and storing the second service-output values at the second service-output location via the second-service bus.

7. The method of claim 6, wherein providing at least one of the services includes:

maintaining a cache of service-output values for the at least one service; and generating at least some service-output values for the at least one service by accessing cache values stored prior to receiving a corresponding task-pending notification.

8. The method of claim 1, wherein the communication bus is an Enterprise Service Bus (ESB).

9. A non-transitory computer-readable medium that stores a computer program for executing a task, wherein the computer program includes instructions that, when executed by a computer, cause the computer to perform operations comprising:

saving the task as a sequence of services including a first service and a second service with each non-final service output corresponding to a subsequent service input in the sequence of services, the saved task including a service-completion record for the services and a first service-input location that indicates where first service-input values are stored for the first service, the saved task being stored at a saved-task location that is connected via a communication bus to a plurality of service providers including a first service provider corresponding to the first service and a second service provider corresponding to the second service, each service provider performing distributed operations in response to a corresponding task-pending notification received via the communication bus, and the distributed operations being decentralized from operations related to sequencing the services of the task;

sending a first task-pending notification to the first service provider via the communication bus, the first task-pending notification including the first service-input location;

receiving a first task-results notification from the first service provider via the communication bus, the first task-results notification including a first service-output location that indicates where the first service provider has stored corresponding first service-output values via a first-service bus that is separate from the communication bus, the first service-output values being generated by the first service provider based on values from the first service-input location, and the values from the first service-input location being accessed by the first service provider separately from the communication bus via the first-service bus;

in response to receiving the first task-results notification, updating the service-completion record at the saved task location to indicate a completion of the first service and sending a second task-pending notification to the second service provider via the communication bus, the second task-pending notification including the first service-output location identified as a second service-input location that indicates where second service-input values are stored for the second service;

receiving a second task-results notification from the second service provider via the communication bus, the second task-results notification including a second service-output location that indicates where the second service provider has stored corresponding second service-output values via a second-service bus that is separate from the communication bus, the second service-output values being generated by the second service provider based on values from the second service-input location, and the values from the second service-input location being accessed by the second service provider separately from the communication bus via the second-service bus; and in response to receiving the second task-results notification, updating the service-completion record at the saved-task location to indicate a completion of the second service.

10. The computer-readable medium of claim 9, wherein the computer program further includes instructions that, when executed by the computer, cause the computer to perform operations comprising:
receiving task-input values from a user to specify the first service-input values.

11. The computer-readable medium of claim 9, wherein the computer program further includes instructions that, when executed by the computer, cause the computer to perform operations comprising:
providing selected service-output values to a user as a final result of the task.

12. The computer-readable medium of claim 9, wherein the services include a third service with a corresponding third service provider connected to the communication bus, and the computer program further includes instructions that, when executed by the computer, cause the computer to perform operations comprising:
sending a third task-pending notification to the third service provider via the communication bus, the third task-pending notification including the second service-output location identified as a third service-input location that indicates where input values for the third service are stored; and
receiving a third task-results notification from the third service provider via the communication bus, the third task-results notification including a third service-output location that indicates where the third service provider has stored corresponding third service-output results via a third-service bus that is separate from the communication bus, the third service-output values being generated by the third service provider based on values from the third service-input location.

13. The computer-readable medium of claim 9, wherein the computer program further includes instructions that, when executed by the computer, cause the computer to perform operations comprising:
identifying at least one of the service providers by accessing a service-provider interface and relating the service-provider interface to at least one of the services.

14. The computer-readable medium of claim 9, wherein the first and second task-pending notifications each include the saved-task location and the computer program further includes instructions that, when executed by the computer, cause the computer to perform operations comprising:
providing the first service at the first service provider by accessing the first service-input values at the first service-input location and at least one first-service parameter at the saved-task location, generating the first service-output values from the first service-input values and the at least one first-service parameter, and storing the first service-output values at the first service-output location via the first-service bus; and
providing the second service at the second service provider by accessing the second service-input values at the second service-input location and at least one second-service parameter at the saved-task location, generating the second service-output values from the second service-input values and the at least one second-service parameter and storing the second service-output values at the second service-output location via the second-service bus.

15. The computer-readable medium of claim 14, wherein providing at least one of the services includes:
maintaining a cache of service-output values for the at least one service; and
generating at least some service-output values for the at least one service by accessing cache values stored prior to receiving a corresponding task-pending notification.

16. An apparatus that executes a task, the apparatus comprising at least one computer configured to perform operations for computer-implemented modules including:
a task-saving module that performs operations including: saving the task as a sequence of services including a first service and a second service with each non-final service output corresponding to a subsequent service input in the sequence of services, the saved task including a service-completion record for the services and a first service-input location that indicates where first service-input values are stored for the first service, the saved task being stored at a saved-task location that is connected via a communication bus to a plurality of service providers including a first service provider corresponding to the first service and a second service provider corresponding to the second service, each service provider performing distributed operations in response to a corresponding task-pending notification received via the communication bus, and the distributed operations being decentralized from operations related to sequencing the services of the task;
a first task-pending notification module that performs operations including: sending a first task-pending notification to the first service provider via the communication bus, the first task-pending notification including the first service-input location;
a first task-results notification module that performs operations including: receiving a first task-results notification from the first service provider via the communication bus, and updating the service-completion record at the saved-task location to indicate a completion of the first service in response to receiving the first task-results notification, the first task-results notification including a first service-output location that indicates where the first service provider has stored corresponding first service-output values via a first-service bus that is separate from the communication bus, the first service-output values being generated by the first service provider based on values from the first service-input location and the values from the first service-input location being accessed by the first service provider separately from the communication bus via the first-service bus;
a second task-pending notification module that performs operations including: sending a second task-pending notification to the second service provider via the communication bus, the second task-pending notification including the first service-output location identified as a second service-input location that indicates where second service-input values are stored for the second service; and
a second task-results notification module that performs operations including: receiving a second task-results notification from the second service provider via the communication bus, and updating the service-completion record at the saved-task location to indicate a completion of the second service in response to receiving the second task-results notification, the second task-results notification including a second service-output location that indicates where the second service provider has stored corresponding second service-output values via a second-service bus that is separate from the communication bus, the second service-output values being generated by the second service provider based on values from the second service-input location, and the values from the second service-input location being accessed by the second service provider separately from the communication bus via the second-service bus.

17. The apparatus of claim 16, wherein the task-saving module performs operations including: receiving task-input values from a user to specify the first service-input values.

18. The apparatus of claim 16, wherein the apparatus performs operations including: providing selected service-output values to a user as a final result of the task.

19. The apparatus of claim 16, wherein the services include a third service with a corresponding third service provider connected to the communication bus, and the apparatus further comprises:
a third task-pending notification module that performs operations including: sending a third task-pending notification to the third service provider, the third task-pending notification including the second service-output location identified as a third service-input location that indicates where input values for the third service are stored; and
a third task-results notification module that performs operations including: receiving a third task-results notification from the third service provider via the communication bus, the third task-results notification including a third service-output location that indicates where the third service provider has stored corresponding third service-output results via a third-service bus that is separate from the communication bus, the third service-output values being generated by the third service provider based on values from the third service-input location.

20. The apparatus of claim 16, wherein the apparatus performs operations including: identifying at least one of the service providers by accessing a service-provider interface and relating the service-provider interface to at least one of the services.

21. The apparatus of claim 16, wherein the first and second task-pending notifications each include the saved-task location and the apparatus further comprises:
a first service module at the first service provider, wherein the first service module performs operations including: providing the first service at the first service provider by accessing the first service-input values at the first service-input location and at least one first-service parameter at the saved-task location, generating the first service-output values from the first service-input values and the at least one first-service parameter, and storing the first service-output values at the first service-output location via the first-service bus; and
a second service module at the second service provider, wherein the second service module performs operations including: providing the second service at the second service provider by accessing the second service-input values at the second service-input location and at least one second-service parameter at the saved-task location, generating the second service-output values from the second service-input values and the at least one second-service parameter and storing the second service-output values at the second service-output location via the second-service bus.

22. The apparatus of claim 21, wherein providing at least one of the services includes:
maintaining a cache of service-output values for the at least one service; and
generating at least some service-output values for the at least one service by accessing cache values stored prior to receiving a corresponding task-pending notification.

* * * * *